(12) United States Patent
Zick (10) Patent No.: US 7,434,054 B2
(45) Date of Patent: Oct. 7, 2008

(54) ASYNCHRONOUS ENHANCED SHARED SECRET PROVISIONING PROTOCOL

(75) Inventor: Donald A. Zick, Saline, MI (US)

(73) Assignee: Microsoft Corporation, Redmond, WA (US)

(*) Notice: Subject to any disclaimer, the term of this patent is extended or adjusted under 35 U.S.C. 154(b) by 332 days.

(21) Appl. No.: 10/813,357

(22) Filed: Mar. 31, 2004

(65) Prior Publication Data

US 2005/0223230 A1 Oct. 6, 2005

(51) Int. Cl.
*H04L 9/00* (2006.01)
(52) U.S. Cl. .................. 713/171; 713/168; 380/47
(58) Field of Classification Search ........... 713/171, 713/169
See application file for complete search history.

(56) References Cited

U.S. PATENT DOCUMENTS

| | | | |
|---|---|---|---|
| 5,625,888 A | | 4/1997 | Ruther et al. |
| 6,263,437 B1 | | 7/2001 | Liao et al. |
| 6,377,804 B1 | * | 4/2002 | Lintulampi ............... 455/435.2 |
| 6,766,453 B1 | * | 7/2004 | Nessett et al. ................ 713/171 |
| 7,191,467 B1 | * | 3/2007 | Dujari et al. .................... 726/5 |
| 2002/0012433 A1 | | 1/2002 | Haverinen et al. |
| 2003/0221126 A1 | * | 11/2003 | Berman et al. ............... 713/201 |

FOREIGN PATENT DOCUMENTS

| | | |
|---|---|---|
| EP | 0254812 | 4/1987 |
| EP | 1117271 | 11/2000 |
| WO | WO 00/72499 | 5/2000 |

OTHER PUBLICATIONS

B. Aboba et al., "EAP GSS Authentication Protocol", Internet-Draft, <draft-aboba-pppext-eapgss-12.txt>, http://www.ietf.org/ietf/lid-abstracts.html, The Internet Society, Apr. 2002.
H. Haverinen, "EAP SIM Authentication", Internet-Draft, <draft-haverinen-pppext-eap-sim-04.txt>, http://www.ietf.org/ietf/lid-abstracts.html, The Internet Society, Jun. 2002.
J. Arkko et al., "EAP AKA Authentication", Internet-Draft, <draft-arkko-pppext-eap-aka-03.txt>, http://www.ietf.org/ietf/lid-abstracts.html, The Internet Society, Feb. 2002.

(Continued)

*Primary Examiner*—Kambiz Zand
*Assistant Examiner*—Roderick Tolentino
(74) *Attorney, Agent, or Firm*—Amin, Turocy & Calvin, LLP (57) ABSTRACT

An Asynchronous Enhanced Shared Secret Provisioning Protocol (ESSPP) provides a novel method and system for adding devices to a network in a secure manner. A registration process is launched by at least one of two network devices together. These two devices then automatically register with each other. When two devices running Asynchronous ESSPP detect each other, they exchange identities and establish a key that can later be used by the devices to mutually authenticate each other and generate session encryption keys. An out-of-band examination of registration signatures generated at the two devices can be performed to help ensure that there was not a man-in-the-middle attacker involved in the key exchange.

30 Claims, 3 Drawing Sheets

OTHER PUBLICATIONS

H. Andersson et al., "Protected EAP Protocol (PEAP)", Internet-Draft, <draft-josefsson-pppext-eap-tls-eap-02.txt>, http://www.ietf.org/ietf/lid-abstracts.html, The Internet Society, Feb. 2002.

B. Aboba et al., "The EAP Keying Problem", Internet-Draft, <draft-aboba-pppext-key-problem-01.txt>, http://www.ietf.org/ietf/lid-abstracts.html, The Internet Society, Feb. 2002.

G. Tsirtsis, "EAP over ICMP", Internet-Draft, <draft-tsirtsis-eap-over-icmp-00.txt>, http://www.ietf.org/ietf/lid-abstracts.html, The Internet Society, Jan. 2002.

S. Josefsson, "The EAP SecurID(r) Mechanism", Internet-Draft, <draft-josefsson-eap-securid>, http://www.ietf.org/ietf/lid-abstracts.html, The Internet Society, Feb. 2002.

D. Potter et al., "PPP EAP MS-CHAP-V2 Authentication Protocol", Internet-Draft, <draft-dpotter-pppext-eap-mschap-01.txt>, http://www.ietf.org/ietf/lid-abstracts.html, Jan. 2002.

B. Aboba, "EAP IANA Considerations", Internet-Draft, <draft-aboba-pppext-eap-iana-01.txt>, http://www.ietf.org/ietf/lid-abstracts.html, The Internet Society, Feb. 2002.

B. Aboba, "The Vendor-Specific EAP Method", Internet-Draft, <draft-aboba-pppext-eap-vendor-01.txt>, http://www.ietf.org/ietf/lid-abstracts.html, The Internet Society, Feb. 2002.

P. Engelstad, "EAP over UDP (EAPoUDP)", Internet-Draft, <draft-engelstad-pana-eap-over-udp-00.txt>, http://www.ietf.org/ietf/lid-abstracts.html, Feb. 2002.

B. Aboba et al., "Radius Support For Extensible Authentication Protocol (EAP)", Internet-Draft, <draft-aboba-radius-rfc2869bis-02.txt>, http://www.ietf.org/ietf/lid-abstracts.html, The Internet Society, May 2002.

B. Payne, "Extensible Authentication Protocol State Machine", Internet-Draft, <draft-payne-eap-sm-00.txt>, http://www.ietf.org/ietf/lid-abstracts.html, The Internet Society, May 2002.

P. Funk et al., "EAP Tunneled TLS Authentication Protocol (EAP-TTLS)", Internet-Draft, <draft-ietf-pppext-eap-ttls-01.txt>, http://www.ietf.org/ietf/lid-abstracts.html, The Internet Society, Aug. 2001.

L. Blunk et al., "Extensible Authentication Protocol (EAP)", Internet-Draft, <draft-ietf-pppext-rfc2284bis-04.txt>, http://www.ietf.org/ietf/lid-abstracts.html, The Internet Society, Apr. 2002.

W. Simpson, "The Point-to-Point Protocol (PPP)", Network Working Group, Jul. 1994.

L. Blunk et al., "PPP Extensible Authentication Protocol (EAP)", Network Working Group, Mar. 1998 (XP-002239395).

B. Aboba et al., "PPP EAP TLS Authentication Protocol", Network Working Group, Oct. 1999.

XP-002296898, "Shared Secret Provisioning Protocol," by R. Moskowitz, ICSA Labs, Jan. 2003, pp. 1-6.

* cited by examiner

250# ASYNCHRONOUS ENHANCED SHARED SECRET PROVISIONING PROTOCOL

FIELD OF THE INVENTION

The present invention relates to the field of secure network registration processes that allow two devices to register with each other, and more particularly to a registration process where two devices learn each other's identities and establish a shared key that can later be used by the devices to mutually authenticate each other, to generate session encryption keys, to generate credentials, and for other purposes.

BACKGROUND OF THE INVENTION

The protection of information and secrets over a network requires the use of secure methods to add new devices to the network. It is possible to breach network security and gain access to network information and secrets through interfering with the registration process of devices with the network. One method of interfering with the registration of network devices is through interjecting an imposter device into the registration process. If this imposter device can successfully pose as the legitimate device during the registration process, then it is possible for the imposter device to register with the network and masquerade as the legitimate device. As a result, the imposter device can gain access to the information and secrets stored on the network. It is therefore desirable to develop methods and systems that can provide a secure method for registering a device with a network.

A variety of methods and systems are known to facilitate communications between two devices. One such protocol is the Diffie-Hellman key agreement protocol. The Diffie-Hellman key agreement protocol (also called exponential key agreement) was developed by Diffie and Hellman in 1976 and published in the paper "New Directions in Cryptography." The protocol allows two users to establish a secret key over an insecure medium without any prior secrets. The protocol has two system parameters p and g. They are both public and may be used by all the users in a system. Parameter p is a prime number and parameter g (usually called a generator) is an integer less than p, which is capable of generating every element from 1 to p−1 when multiplied by itself a certain number of times, modulo the prime p. The protocol depends on the discrete logarithm problem for its security. It assumes that it is computationally infeasible to calculate the shared secret key $k=g^{ab}$ mod p given the two public values $g^a$ mod p and $g^b$ mod p when the prime p is sufficiently large. Breaking the Diffie-Hellman protocol is equivalent to computing discrete logarithms under certain assumptions.

Another system is the Point-to-Point Protocol (PPP) Extensible Authentication Protocol (EAP). EAP is a general system for PPP authentication that is compatible with a variety of authentication mechanisms. EAP does not select a specific authentication mechanism at a Link Control Phase, but rather postpones this selection until an Authentication Phase. This postponement enables the authenticator to request more information prior to determining the specific authentication mechanism. In addition, this postponement also enables the use of a "back-end" server that actually implements the various mechanisms while the PPP authenticator merely passes through the authentication exchange.

RSA is yet another protocol system that provides an algorithm for public key cryptography. The "key" of an RSA cipher has three numbers: the first is the public exponent, the second is the private exponent, and the third is the modulus. The public key is formed from the public exponent and the modulus. The private key is formed from the private exponent and modulus. If two devices are to engage in encrypted communications, they each generate a pair of keys. These devices then may exchange public keys using a non-secure communications channel. Thereafter, when the devices engage in encrypted communications, one device can encrypt the message using the other devices' public key and send it via a non-secure channel. Since the private keys are not exchanged, decryption by an eves dropper proves difficult.

Consider the case of a wireless network with an access point in infrastructure mode. Suppose a user buys a wireless printer and wants to connect the printer to the network. If Wi-Fi Protected Access (WPA) is enabled on the access point, the user has a variety of options for setting up a secure connection between the access point and printer.

The user can install a WPA pre-shared key on the access point and on the printer. Note that pre-shared keys are not device-specific. Also, multiple devices may utilize the same pre-shared key to connect to an access point. Alternatively, if the access point is a client to a Remote Authentication Dial in User Server (RADIUS), or includes the capabilities of a RADIUS server, the printer name and credentials can be added to the RADIUS server database. A RADIUS server is used to authenticate and return parameters including the users IP address, gateway, and DNS server. The printer credentials must also be installed on the printer. The credentials may be a password, key, or certificate. The RADIUS server and printer are also configured to perform the same type of EAP authentication, with the printer acting as the supplicant.

SUMMARY OF THE INVENTION

The present invention is for an Asynchronous Enhanced Shared Secret Provisioning Protocol (ESSPP). Asynchronous ESSPP provides a novel method and system for adding devices to a network in a secure manner. With Asynchronous ESSPP, at least one of two network devices that are attempting to register with each other and establish a secure communications link is provided with a mechanism for starting Asynchronous ESSPP. Examples of these network devices include servers, wireless printers, wireless computers, and network access points, but the protocol can be used for peer-to-peer and other devices. The mechanism may be to select a button located on the device that triggers the Asynchronous ESSPP process, a menu selection provided in a Graphical User Interface (GUI) shown on a display provided with the device, or to enter a code on a terminal of the device, or other trigger mechanism. When, for example, two devices such as the printer and access point run Asynchronous ESSPP at the same time, the two devices automatically register with each other. The Asynchronous ESSPP process allows for registration of network devices without the need to manually install keys, passwords, or certificates to add the device to the network.

With Asynchronous ESSPP, the registration process is activated by triggering a button or other trigger on the network device. The network device then initiates communications with the network to register itself. The registration is not activated until an out-of-band verification process is performed, i.e., in a communications channel different from the one used for the in-band communications. If the verification process gives assurance that the registration was secure, the registration may be accepted. Once accepted, the network device and the network can use a shared secret created in the registration process for authentication or other cryptographic function such as generating a credential.

When a device runs Asynchronous ESSPP, it searches for another device running Asynchronous ESSPP. When two devices running Asynchronous ESSPP detect each other they exchange identities and establish a shared secret that can later be used by the devices to mutually authenticate each other and generate session encryption keys. In a wireless network, the shared secret can be used as a pre-shared key or it can be used for 802.1x authentication using an Extensible Authentication Protocol (EAP).

BRIEF DESCRIPTION OF THE DRAWINGS

The present invention is further described in the detailed description which follows, in reference to the noted drawings by way of non-limiting examples of certain embodiments of the present invention, in which like numerals represent like elements throughout the several views of the drawings, and wherein.

DETAILED DESCRIPTION OF PREFERRED EMBODIMENTS

The particulars shown here are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

A novel method and system for registering devices with a network in a secure manner is provided through an Asynchronous Enhanced Secure Shared Provisioning Protocol (ESSPP). With Asynchronous ESSPP, at least one of two network devices that are attempting to register with each other and establish a secure communications link are provided with a mechanism for starting Asynchronous ESSPP.

A preferred general process flow for Asynchronous ESSPP is provided in protocol flow 1 below. The mathematical terminology used for the purposes of describing the Asynchronous ESSPP process flows is documented in the Internet Engineering Task Force (IETF) Internet Draft "draft-moskowitz-shared-secret-provprotocol-01.txt". This IETF document describes a Shared Secret Provisioning Protocol (SSPP). Where possible, the same notation used in SSPP is used here.

| | |
|---|---|
| (Xs, Ys) | Server's Diffie-Hellman static key pair |
| (Xc, Yc) | Client's Diffie-Hellman static key pair |
| (p, q, g) | Diffie-Hellman domain parameters |
| AddressS | Server's address or name |
| NonceS | Random number generated by Server used in the exchange |
| NonceSecurityCode | Random number generated by Server; used in calculation of the SecurityCode |
| NonceSecurityCodeHash | A hash of the NonceSecurityCode and NonceS. Calculated as: SHA1(NonceS ‖ NonceSecurityCode) |
| AddressC | Client's address or name |
| NonceC | Random number generated by Client used in the exchange |
| Zs | Diffie-Hellman generated shared secret (Ys^Xc mod p) or ((Yc^Xs mod p) |
| kdf | Key Derivation Function specified in SSPP |
| k | Shared key generated by Client and Server as: kdf(Zs, AddressC, AddressS, keydatalen, hashlen, NonceC, nonceS |
| proofS | A hash generated by Server to prove he knows Zs. Calculated as: LTRUN96(HMAC-SHA1(Zs, (AddressS ‖ NonceC ‖ NonceSecurityCode))) LTRUN96 performs a left truncation, returning the left most 96 bits of data. |
| proofC | A hash generated by Client to prove she knows Zs. Calculated as: LTRUN96(HMAC-SHA1(Zs, (Yc ‖ AddressC ‖ NonceS ))) |
| SecurityCode | A hash generated by both client and server that may be manually inspected to ensure no man-in-the-middle participated in a registration. Calculated as: Base32Encode(LTRUN40(SHA1(Zs ‖ NonceSecurityCode))) |

Protocol flow 1 below illustrates Asynchronous ESSPP registration of a network device with a network. Asynchronous ESSPP allows for the registration of the network device with the network without a synchronous activation of triggers on both the network device and the network. With Asynchronous ESSPP, the registration process is activated by triggering a button on the network device. The network device then initiates communications with the network to register itself. The registration is not activated until an out-of-band verification process is performed, i.e., in a communications channel different from the one used for the in-band communications. If the verification process gives assurance that the registration was secure, the registration may be accepted. Once accepted, the network device and the network can use credentials created in the registration process for authentication.

Protocol Flow 1

| Network | Network Device |
|---|---|
| | 1. Start Asynchronous ESSPP |
| 2. Generate NonceS and send message | |
| (p,q,g), Ys, AddressS, NonceS, NonceSecurityCodeHash → | |
| | 3. Validate parameters as required by SSPP, generate NonceC, Zs, proofC and send message. |
| ← Yc, AddressC, NonceC, proofC | |
| 4. Generate Zs, validate proofC, generate proofS and send message | |

-continued

Protocol Flow 1

| Network | Network Device |
|---|---|
| NonceSecurityCode, proofS → | |
| | 5. Validate NonceSecurityCode and proofS |
| 6. Generate shared key k and SecurityCode. k can be used to set up a secure connection between the network and the network device after the registration is accepted by the Network. | 6. Generate shared key k and SecurityCode. k can be used to set up a secure connection between the network and the network device after the registration is accepted by the Network Device. |
| 7. Pause registration process | 7. Pause registration process |
| 8. Perform out-of-band signature verification by comparing Network SecurityCode with Network Device SecurityCode. Accept registration if codes match. | 8. Perform out-of-band signature verification by comparing Network SecurityCode with Network Device SecurityCode. Accept Registration if codes match. |
| 9. Use shared key k to establish secure connection with Network Device. | 9. Use shared key k to establish secure connection with Network. |

With Asynchronous ESSPP registration, a network device and network register with each other during a protocol exchange illustrated above in steps 1-6. The Asynchronous ESSPP registration is launched in step 1 at the network device. Subsequently in step 2, the network generates the values NonceS, NonceSecurityCode, and NonceSecurityCodeHash, and transmits (p,q,g), Ys, AddressS, NonceS, and NonceSecurityCodeHash via a message to the network device. In step 3, the network device validates the parameters according to SSPP. In addition, the network device generates NonceC, Zs, proofC. Then, the network device transmits these values along with Yc to the network. Next in step 4, the network generates Zs, validates proofC, and generates proofS. The network then transmits NonceSecurityCode and proofs to the network device. In step 5, the network device validates NonceSecurityCode and proofS. The network device validates NonceSecurityCode by using it to generate NonceSecurityCodeHash and making sure that it generates the same value for NonceSecurityCodeHash that was received from the network. After the protocol exchange in steps 1-5, the network device and network generate SecurityCodes (signatures) or other information for testing identity of the ostensibly shared secret, without revealing the shared secret. In step 6, both the network and network device generate an ostensibly shared key k. After steps 1-6, both the network device and network have an ostensibly shared secret from the registration process. In step 7, the registration process is paused pending an out-of-band verification that occurs in step 8. The shared secrets are the same if a man-in-the-middle has not compromised the communications between the network device and the network. If the SecurityCodes or other indicia of the ostensibly shared secret are determined to be the same, which occurs in step 8, an administrator can accept the registration of the network device with the network, and a user can accept the registration of the network with the network device. The network device and network can then use registration credentials to authenticate each other.

The SecurityCode (signature) verification process in step 8 occurs in a communication channel that is different from the registration process. The signature verification process in step 8 is therefore referred to as an out-of-band process. Unless the signature, or other indicia of the ostensibly shared secret, are validated, the registration of the network device with the network is not accepted. A network administrator may inspect registration information at the network device and at the network. The administrator may choose to accept the registration before the network device may use the registration credentials for authentication. A network device may display, print, or otherwise communicate a signature or other information that the administrator may use to assure herself that the ostensibly shared secrets are the same. The administrator can choose to accept the registration if the signatures are the same. Similarly, the system administrator can choose to reject (delete) them if the registration signatures are dissimilar. This validation process allows for the Asynchronous addition of new network devices to the secure network. The user of the network device can also choose to reject (delete) registration credentials if signatures are dissimilar; this protects the network device from connecting to an imposter network.

Preferably the ostensibly shared secrets are developed using any of a variety of protocols based on Diffie-Hellman key exchange. The Diffie-Hellman exchange protocol generates a shared secret. The registration signature used in the signature verification process of step 8 is derived from this shared secret.

There are a variety of ways of generating registration signatures used for the verification process of step 8. Registration signatures are preferably formed, in a non-limiting example, from a hash of secret information. For example, the registration signature may be formed from a hash of client public key, a hash of server public key, a hash of client/server public keys, a hash of client/server shared key, or a hash of client/server shared key and registration nonce.

A variety of indicia can be used to verify that the ostensibly shared secrets are the same. One indicia of the ostensibly shared secret may be a hash of the secret. Another indicia may be a value computed by exponentiating a base by the secret. If the network device and network have matching registration signatures, there is some assurance that there was no man-in-the-middle attacker during the key exchange protocol. This assurance is based on the fact that when a man-in-the-middle attack is mounted on a Diffie-Hellman exchange, the participants do not generate the same secret value.

There are a variety of out-of-band channels for the validation of signatures for step 8. One method is by providing the network device with a 'save' feature that allows for the saving of the registration signature and other information to a file on a transportable medium, such as a floppy disk. Such additional information may include a registered user name and associated registration signature. It is then possible to deliver the transportable medium to a system administrator. Another method is to provide the network device with a 'print' feature that allows for the creation of a human readable hardcopy of signature information. Such information may include the registered user name and associated registration signature. It is then possible to use this printout in the signature validation process.

With Asynchronous ESSPP, the network device may determine a default name under which it can register. The network administrator may be given the option of overriding this name, or the network administrator can use the default name and perform a registration without having to enter a name. There is also an optional generation of pseudonyms that can be used by the devices to identify each other during EAP authentication without revealing their true identities on the network. Asynchronous ESSPP also provides for an optional anonymous registration that allows two devices to run Asynchronous ESSPP without revealing their identities on the network. In addition, with Asynchronous ESSPP, the operator of the network device need not enter a password or shared key, and need not install certificates. Credentials are established automatically during the registration process.

The out-of-band signature verification of protocol flow 1 provides security against a so-called man-in-the-middle attack. A man-in-the-middle attack occurs where an imposter Malice attempts to interject himself between Alice and Bob who are trying to communicate with each other.

When Alice thinks she is talking to Bob, she in fact is talking to Malice, and when Bob thinks he is talking to Alice, he in fact is talking to Malice. The man-in-the-middle attack allows Malice to establish a shared secret kn with Alice and a shared secret k2 with Bob. If Malice can cause the signature derived from kn to be the same as the signature derived from k2, then Malice can mount a successful attack.

Protocol flow 2 that follows demonstrates an exemplary process of how Malice could mount a man-in-the-middle attack when registration signatures are being used to protect a Diffie-Hellman exchange between Alice and Bob.

| Flow Notation | |
|---|---|
| (Xa, Ya) | Alice's Diffie-Hellman key pair (Xa is private; Ya is public) |
| (Xb, Yb) | Bob's Diffie-Hellman key pair |
| (Xm1, Ym1) | One of Malice's Diffie-Hellman key pairs |
| (Xm2, Ym2) | Malice's Diffie-Hellman key pairs used in exchange with Bob |
| (Xmn, Ymn) | Malice's Diffie-Hellman key pairs that allows Malice to perform a successful attack |
| kn | Malice and Alice's shared secret calculated as Xa^Ymn or Xmn^Ya |
| k2 | Malice and Bob's shared secret calculated as Xb^Ym2 or Xm2^Yb |
| rsn | Alice and Malice's registration signature derived from Alice and Malice's shared key as HASH(kn) |
| rs2 | Malice and Bob's registration signature derived from Malice and Bob's shared key as HASH(k2) |

| Protocol Flow 2 | | |
|---|---|---|
| Alice | Malice | Bob |

1. Alice sends Malice her public key

Ya ⟶

2. Malice sends Bob a public key

Ym2 ⟶

3. Bob calculates k2 and rs2 and sends Malice his public key

⟵ Yb

| -continued | | |
|---|---|---|
| Protocol Flow 2 | | |
| Alice | Malice | Bob |

4. Malice generates k2 and rs2. At this point in time, Malice can try out a number of candidate key pairs to send to Alice looking for a key pair that will cause Alice and Malice's registration signature to match rs2. Malice finds that using the key pair (Xmn,Ymn) results in a match, so Malice sends Ymn to Alice.

⟵ Ymn

5. Alice calculates kn and rsn
6. Alice and Bob do an out-of-band comparison of rsn and rs2 and find them to be equal. Malice has succeeded in the attack.

In a preferred process for registering a network device with a network, such as protocol flow 1, the device and network use an in-band registration process that produces an ostensibly shared secret. Upon completion of an out-of-band verification that the ostensibly shared secrets are the same, a network administrator may choose to accept the registration process.

The use of this out-of-band verification process provides an ability to detect a man-in-the-middle attack. With Asynchronous ESSPP, Malice does not have enough information to generate SecurityCode registration signatures when he selects his Diffie-Hellman key pairs. As a result, if a man-in-the-middle attack does occur, there is a high probability that Malice will not select key pairs that result in Alice and Bob's SecurityCodes matching. The out-of-band verification process illustrated in protocol flow 1 can reveal a SecurityCode mismatch and hence, detect his presence. Absent interference from Malice, rs1 will equal rs2, which is verified in the out-of-band process of protocol flow 1.

If the verification process of step 8 occurred in the same communications band as the one used to generate the shared secret, Malice could continue to interject himself in the process and launch a man-in-the-middle attack during the verification process. However, by using the out-of-band communications channel for verification, Malice is removed from the verification process. As a result, the use of the out-of-band verification process enhances the ability to detect the presence of Malice.

Minimizing Signature Length

It is possible to minimize the length of the registration signature while preserving the ability to detect the man-in-the-middle attack by modifying protocol flow 1 to include a commitment. Protocol flow 3 below demonstrates this.

| Flow Notation | |
|---|---|
| (Xa, Ya) | Alice's Diffie-Hellman key pair (Xa is private; Ya is public) |
| regNonceA | Registration nonce value generated by Alice. |
| hregNonceA | HASH(regNonceA) |
| regNonceM | Registration nonce value generated by Malice. |
| hregNonceM | HASH(regNonceM) |
| (Xb, Yb) | Bob's Diffie-Hellman key pair |
| (Xm1, Ym1) | Malice's Diffie-Hellman key pair used in exchange with Alice |

-continued

Flow Notation

| | |
|---|---|
| (Xm2, Ym2) | Malice's Diffie-Hellman key pair used in exchange with Bob |
| k1 | Malice and Alice's shared secret calculated as Xa^Ym1 or Xm1^Ya |
| k2 | Malice and Bob's shared secret calculated as Xb^Ym2 or Xm2^Yb |
| rs1 | Alice and Malice's registration signature derived from Alice and Malice's shared key as HASH(k1\|\|regNonceA) |
| rs2 | Malice and Bob's registration signature derived from Malice and Bob's shared key as HASH(k2\|\|regNonceM) |

Protocol Flow 3

Alice     Malice     Bob

1. Alice sends Malice her public key and a hash of a registration nonce

Ya,hregNonceA ⟶

2. Malice sends Bob a public key and a hash of a registration nonce

Ym2,hregNonceM ⟶

3. Bob calculates k2 and sends Malice his public key

⟵ Yb

4. Malice generates k2 and rs2. At this point in time, Malice does not know how to calculate rs1, so Malice can only guess a public key that will cause rs1 to equal rs2. Malice guesses Ym1 and sends it to Alice.

⟵ Ym1

5. Alice calculates k1 and rs1
   Alice sends regNonceA to Malice so that Malice can generate rs1.
   regNonceA ⟶

6. Malice can validate regNonceA by generating hregNonceA and verifying that it equals the value of hregNonceA previously received from Alice (but Malice, being an attacker, may not care).
   Malice generates rs1.
   Malice sends regNonceM to Bob so that Bob can generate rs2.

regNonceM ⟶

7. Bob can validate regNonceM by generating hregNonceM and verifying that it equals the value of hregNonceM previously received from Malice. If the validation fails, Bob detects that Malice did not stick to its commitment to regNonceM and fails the exchange.
   Bob generates rs2.
8. Alice and Bob do an out-of-band comparison of rs1 and rs2 and are likely to find them not equal as Malice was not able to try multiple candidate public keys to find one that would result in rs1 equaling rs2.

In protocol flow 3, the nonce is an example of a commitment that allows the registration signature to be shorter than it otherwise would need to be to achieve a desired level of security. An additional advantage of the commitment is that it allows devices to re-use key pairs without sacrificing security.

Registration signatures used to validate Diffie-Hellman key exchanges are currently long, often consisting of 20 byte SHA-1 hashes. A typical registration signature may be displayed as a string of characters consisting of hexadecimal digits such as:

F9 38 32 7B CE 15 58 44 78 35 97 74 88 F2 78 99 28 45 E9 AA

The example registration signature consists of 160 bits of information (4 bits per hexadecimal character). Generally speaking, a 160 bit signature is longer than is needed. It is possible to safely truncate a signature to 96 bits and provide good protection from third party attacks. However, it is desirable to reduce the registration signature size to something much lower than 96 bits in order to simplify the out-of-band signature examination. Also, it is desirable to base32 encode the registration signature (encode the signature using lower case letters and the digits 2-7). This allows 5 bits of the signature to be encoded per character instead of 4. With EAP-Link, a typical registration signature looks like:

we9n-4pfk

This signature contains 40 bits of information, but because of protocol enhancements, still allows for adequate protection from a man-in-the-middle attacker. With a 40 bit registration signature, Malice has a 1 in $2^{40}$ chance of guessing key pairs and a registration nonce value that causes rs1 to equal rs2.

A commitment increases the strength of the registration signature by an amount proportional to the number of key sets an attacker would otherwise be able to try out during or prior to a Diffie-Hellman exchange. With Asynchronous ESSPP, an attacker can only try one set of keys and nonces during a registration exchange, thereby enhancing the security of the protocol exchange. When 40 bits of information are used for the signature as in the above example, an attacker has a 1 in $2^{40}$ chance of providing keys and a registration nonce that will result in a successful attack with Asynchronous ESSPP. Security needs may vary with application and over time, so the length of a key needed to provide security may also vary. However, by use of a commitment, the length of key needed to provide a desired level of security will be less than a key length for a substantially identical system that does not use a commitment.

Asynchronous ESSPP System Components

Figure 1:
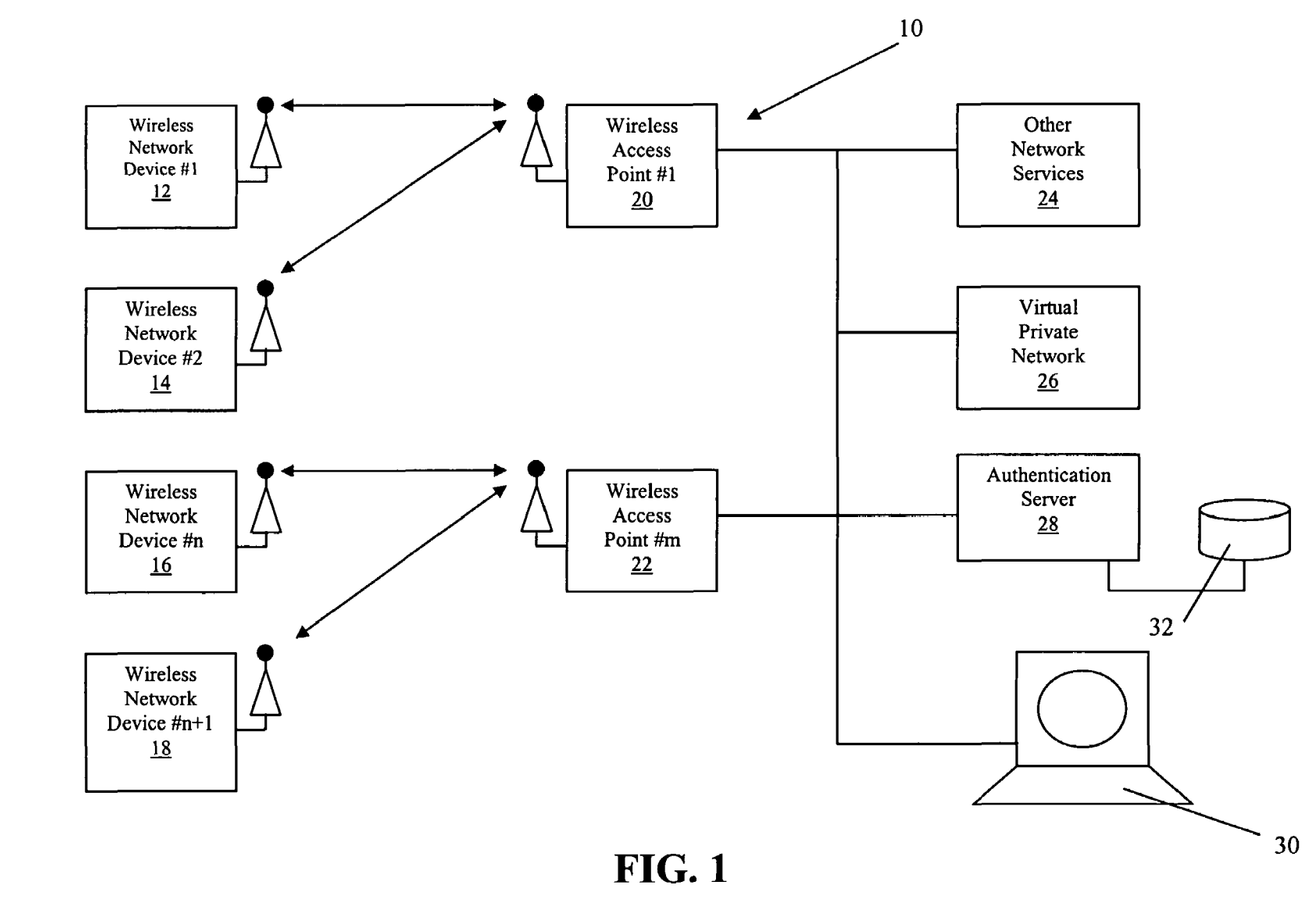
FIG. 1 illustrates a Wi-Fi network that supports Asynchronous ESSPP in accordance with a preferred embodiment of the present invention.

FIG. 1 illustrates a Wi-Fi network 10 that supports Asynchronous ESSPP in accordance with a preferred embodiment of the present invention. Wi-Fi network 10 includes network devices 12, 14, 16, and 18 that are numbered as devices 1, 2, n, and n+1 respectively. These numbered designations illustrate that network 10 may support as many as n+1 wireless devices.

Wireless network devices 12-18 are connected to Wi-Fi network through wireless access points 20 and 22 that are respectively numbered 1 and m. In order to support n+1 wireless network devices, network 10 may utilize as many as m wireless access points.

Wireless access points 20 and 22 numbered 1 and m may couple to other network devices 24, a virtual private network 26, as well as an authentication server 28. In addition, wireless access points 20 and 22 may couple to a terminal 30. Coupled to authentication server 28 is a storage facility 32.

Wireless network devices 12-18 are each provided with the mechanism that activates the Asynchronous ESSPP protocol on wireless network devices 12-18 as described in step 1 of protocol flow 1. This mechanism may take the form of a button, a switch, a menu selection on a Graphical User Interface (GUI), or some other embodiment of a trigger.

When Asynchronous ESSPP is activated on one of network devices 12-18 or authentication server 28, Asynchronous ESSPP proceeds to step 2 as outlined in protocol flow 1.

All Asynchronous ESSPP communications between wireless network devices 12-18 and authentication server 28 occurs through wireless access points 20-22. While network devices 12-18 are illustrated as communicating with authentication server 28 through wireless network 10, other forms of communication are possible, such as via satellite, dial up connection, broadband, cable, fire-wire, an Internet and World Wide Web, as well as other methods.

Figure 2:
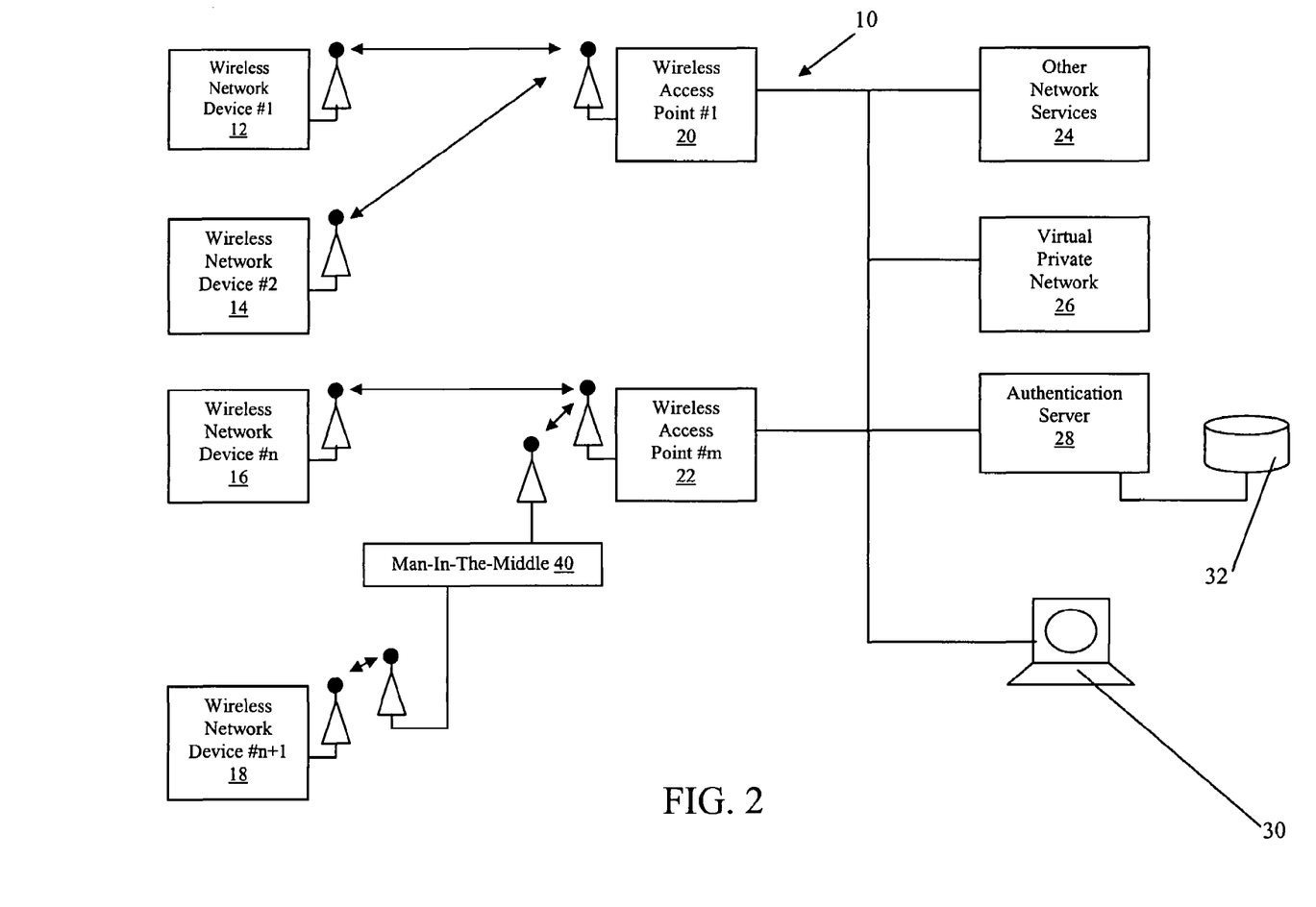
FIG. 2 illustrates a "man-in-the-middle" attack on a Wi-Fi network that supports Asynchronous ESSPP in accordance with a preferred embodiment of the present invention.

FIG. 2 illustrates a "man-in-the-middle" attack on Wi-Fi network 10 that supports Asynchronous ESSPP in accordance with a preferred embodiment of the present invention. Depicted in FIG. 2 is a man-in-the-middle device 40 that is attempting a man-in-the-middle attack on network 10. Man-in-the-middle device 40 broadcasts communications to both authentication server 28 or network device 18. Through broadcasting these communications, man-in-the-middle device 40 is attempting to interfere with the Asynchronous ESSPP process occurring between authentication server 28 and network device 18 and engage in a man in the middle attack. Through this man-in-the-middle attack, man-in-the-middle device 40 is attempting to register itself with authentication server 28 posing as wireless network device 18 and is also attempting to get wireless network device 18 to connect to it.

Figure 3:
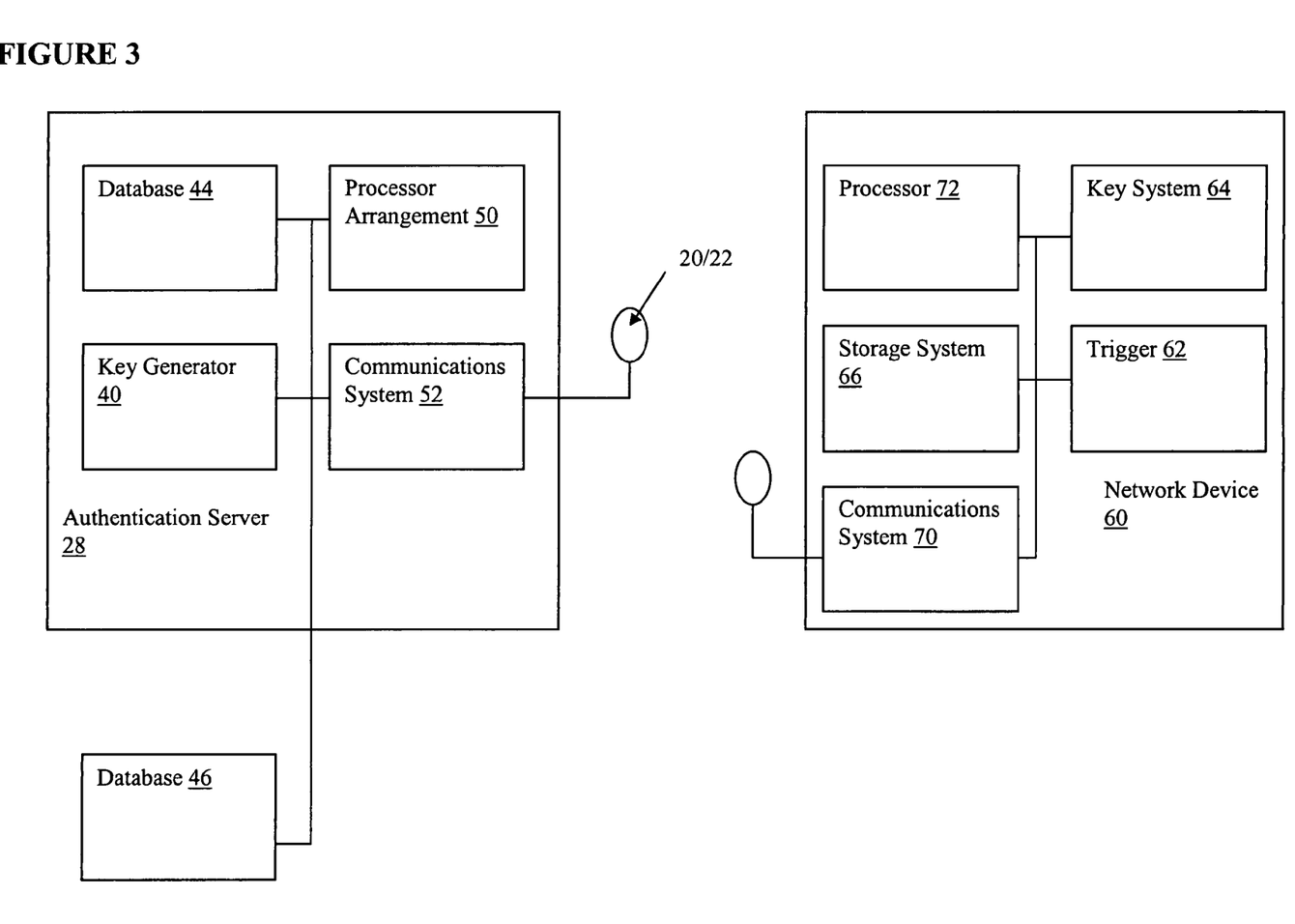
FIG. 3 illustrates a block diagram of an authentication server and a network device in accordance with a preferred embodiment of the present invention.

A block diagram depicting a system that supports the Asynchronous ESSPP is illustrated in FIG. 3. Authentication server 28 supports a variety of subsystems that enable it to support the Asynchronous ESSPP. Among these systems are a key generator 40 that supports the cryptographic keys used with the Asynchronous ESSPP process. Specifically, key generator 40 is able to create a cryptographic key in accordance with the Asynchronous ESSPP process, such as through a Diffie-Hellman process, an RSA process, or an EAP process.

Authentication sever 28 includes an internal database 44 and/or an external database 46. Databases 44 and 46 are provided with authentication server 28 to enable authentication server 28 to store information including network system addresses and identity information, pseudonym information, cryptographic key information, and other related information. A processor arrangement 50 is provided that couples to database 44 and 46, and key generator 40.

A communications system 52 is coupled to server that enables authentication server 28 to communicate with remote network devices 12-18 through wireless access points 20 and 22. Alternatively, other methods of communication are suitable including communication via satellite, a computer network such as the Internet and a World Wide Web, LAN, or Ethernet, and broadband.

A network device 60 seeking to securely register with authentication server 28 is also illustrated. As with authentication server 28, network device 60 also supports a variety of subsystems that enable it to support the Asynchronous Enhanced Shared Secret Provisioning Protocol. Network device 60 includes a registration trigger 62. This trigger 62 initiates execution of the Asynchronous ESSPP process on network device 60 when trigger 62 is activated. Network device 60 includes a key system 64 that supports the cryptographic key in accordance with the Asynchronous ESSPP process. This support can include either generation or receipt and storage of a cryptographic key in accordance with the Asynchronous ESSPP process, such as through a Diffie-Hellman process, an RSA process, or an EAP process. Also, it is possible that server 28 could receive the cryptographic key from network device 60.

Storage system 66 provided on network device 60 provides data storage for network address information, identity information, pseudo names, cryptographic key, and other related information. A communications system 70 is provided to enable network device 60 to communicate with authentication server 28 through wireless or other communication methods. A processor arrangement 72 is provided that couples to storage system 66, trigger 62, communications system 70, and key system 64.

Diffie-Hellman Key Exchanges

The Diffie-Hellman key exchange is used to generate a key from which session keys can be derived. Wireless devices commonly use 128 bit session keys for symmetric encryption. The Diffie-Hellman key exchanges should therefore be as strong as a 128 bit symmetric key so that the Diffie-Hellman key exchange is not the weak link in the registration and authentication process.

The following table is taken from a recent Internet draft, "More MODP Diffie-Hellman groups for IKE". It is an equivalency table showing for different Diffie-Hellman prime moduli what symmetric key sizes are required to have equivalent strengths. The strength comparisons are estimates.

| Group | Modulus | Strength Estimate 1 | | Strength Estimate 2 | |
|---|---|---|---|---|---|
| | | in bits | exponent size | in bits | exponent size |
| 5 | 1536 bit | 90 | 180 | 120 | 240 |
| 14 | 2048 bit | 110 | 220 | 160 | 320 |
| 15 | 3072 bit | 130 | 260 | 210 | 420 |
| 16 | 4096 bit | 150 | 300 | 240 | 480 |
| 17 | 6144 bit | 170 | 340 | 270 | 540 |
| 18 | 8192 bit | 190 | 380 | 310 | 620 |

The table indicates that a 2048-bit Diffie-Hellman key provides the strength of a symmetric key probably somewhere between 110 and 160 bits in strength. Based on the estimates in this table, a 2048-bit Diffie-Hellman prime modulus is recommended for use with Asynchronous ESSPP on wireless networks.

Asynchronous ESSPP may use prime moduli defined in the IETF draft, "More MODP Diffie-Hellman groups for IKE". In a wireless network, the Authentication Server may indicate, by group number, which Diffie-Hellman prime modulus may be used. Asynchronous ESSPP devices supports group 5, 14, and 15.

Wei Dai has published benchmarks for Diffie-Hellman key exchanges at:http://www.eskimo.com/~weidai/benchmarks.html.

His measurements indicate that Diffie-Hellman 2048 Key-Pair Generation and Key Agreement takes 49.19 milliseconds on a Celeron 850 MHz processor running Windows 2000 SP1.

The Diffie-Hellman key agreement protocol (also called exponential key agreement) was developed by Diffie and Hellman in 1976 and published in the ground-breaking paper "New Directions in Cryptography." The protocol allows two users to exchange a secret key over an insecure medium without any prior secrets.

The protocol has two system parameters p and g. They are both public and may be used by all the users in a system. Parameter p is a prime number and parameter g (usually called a generator) is an integer less than p, with the following property: for every number n between 1 and p−1 inclusive, there is a power k of g such that $n=g^k$ mod p.

Suppose Alice and Bob want to agree on a shared secret key using the Diffie-Hellman key agreement protocol. They proceed as follows: First, Alice generates a random private value α and Bob generates a random private value b. Both a and b are drawn from the set of integers $\{1, \ldots, p-2\}$. Then they derive their public values using parameters p and g and their private values. Alice's public value is $g^a$ mod p and Bob's public value is $g^b$ mod p. They then exchange their public values. Finally, Alice computes $g^{ab}=(g^b)^a$ mod p, and Bob computes $g^{ba}=(g^a)^b$ mod p. Since $g^{ab}=g^{ba}=k$, Alice and Bob now have a shared secret key k.

The protocol depends on the discrete logarithm problem for its security. It assumes that it is computationally infeasible to calculate the shared secret key $k=g^{ab}$ mod p given the two public values $g^a$ mod p and $g^b$ mod p when the prime p is sufficiently large. Maurer has shown that breaking the Diffie-Hellman protocol is equivalent to computing discrete logarithms under certain assumptions.

The Diffie-Hellman key exchange is vulnerable to a man-in-the-middle attack. In this attack, an opponent Carol intercepts Alice's public value and sends her own public value to Bob. When Bob transmits his public value, Carol substitutes it with her own and sends it to Alice. Carol and Alice thus agree on one shared key and Carol and Bob agree on another shared key. After this exchange, Carol simply decrypts any messages sent out by Alice or Bob, and then reads and possibly modifies them before re-encrypting with the appropriate key and transmitting them to the other party. This vulnerability is present because Diffie-Hellman key exchange does not authenticate the participants. Possible solutions include the use of digital signatures and other protocol variants.

It is noted that the foregoing examples have been provided merely for the purpose of explanation and are in no way to be construed as limiting of the present invention. While the present invention has been described with reference to certain embodiments, it is understood that the words which have been used herein are words of description and illustration, rather than words of limitation. Changes may be made, within the purview of the disclosure, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses.

What is claimed is:

1. A method for registering a first device with a second device, comprising the steps of:

initiating communication between the first device and the second device over a first communication channel by engaging a trigger at the first device and detecting at the second device that the trigger at the first device has been engaged;

upon initiation of communication between the first device and the second device, deriving a commitment value at the first device from a registration nonce value known to the first device and communicating the commitment value from the first device to the second device;

communicating information from the second device to the first device for use in generating a secret;

communicating a registration nonce value from the first device to the second device in response to the information communicated from the second device;

at the second device, attempting to derive the commitment value from the registration nonce value communicated from the first device;

if the commitment value is successfully derived by the second device, generating a first secret known to the first device and a second secret known to the second device using communications between the first device and the second device over the first communication channel;

from the first device, producing first information derived from the first secret;

from the second device, producing second information derived from the second secret;

using a communication channel other than the first communication channel, comparing the first information and the second information in a manner sufficient to assure a third party that the first secret and the second secret are the same; and enabling the first and second device to use the first and second secrets upon the third party being assured that the first secret and the second secret are the same.

2. The method of claim 1 wherein the first device and the second device generate the first and second secrets using Diffie-Hellman key exchange.

3. The method of claim 1 wherein:
the first information is derived from a hash of the first secret; and
the second information is derived from a hash of the second secret.

4. The method of claim 1 wherein the first information comprises a credential.

5. A method for registering a first device with a second device, comprising the steps of:

(a) engaging a trigger coupled to the first device, wherein the trigger is a switch or a button;

(b) detecting at the second device that the trigger coupled to the first device has been engaged;

(c) after step (b), communicating a commitment value from the first device to the second device over a first communication channel, wherein said commitment value is derived from a security value known to the first device;

(d) communicating from the second device to the first device over the first communication channel, information for use in generating a first secret;

(e) after step (d), communicating a security value from the first device to the second device;

(f) at the second device, attempting to derive the commitment value communicated to the second device at step (c) from the security value communicated to the second device at step (e) and terminating registration if the commitment value is not correctly derived from the security value;

(g) generating the first secret at the first device and a second secret at the second device;

(h) from the first device, on a communication channel other than the first communication channel, validating first verification information related to the first secret;

(i) from the second device, on a communication channel other than the first communication channel, validating second verification information related to the second secret; and (j) enabling the first and second devices to use the first and second secrets upon a third party being assured that the first secret and the second secret are the same.

6. The method of claim 5 wherein the commitment value is a hash of the security value.

7. The method of claim 5 wherein the first verification information is a hash value derived from the first secret and the security value.

8. The method of claim 7 wherein the first verification information is a hash value derived from a catenation of the first secret with the security value.

9. The method of claim 5 wherein the length of the first verification information is shorter than a length needed to provide an identical level of security in a method that does not utilize a commitment value.

10. The method of claim 5 wherein the first verification information comprise a credential.

11. A device capable of registering with an other device, comprising:
 a trigger coupled to the device, the trigger comprising a switch or a button;
 an interface to a first communication channel associated with a first communication method;
 an interface to a second communication channel associated with a communication method other than the first communication method; and
 a registration process that (1) initiates communication with the other device over the first communication channel upon engagement of the trigger coupled to the device and acknowledgement at the other device that the trigger has been engaged, (2) receives a hash of a security value from the other device using the first communication channel, (3) receives a security value from the other device using the first communication channel and terminates registration if a generated hash of the security value received from the other device differs from the hash received at step (2), (4) generates a first secret that is to-be-shared with the other device using the first communication channel, (5) validates on the second communication channel verification information derived from the to-be-shared secret, and (6) is enabled to use the to-be-shared secret upon receipt of an indication that a third party is assured that the first secret is shared with the other device.

12. The device of claim 11 wherein the device generates the first secret using a Diffie-Hellman key exchange.

13. The device of claim 11 wherein the verification information is derived from a hash of the first secret.

14. The device of claim 11 wherein the verification information comprises a credential.

15. A device capable of registering with an other device, comprising:
 a trigger coupled to the device;
 an interface to a first communication channel associated with a first communication method;
 an interface to a second communication channel associated with a communication method other than the first communication method; and
 a registration process that (1) initiates communication with the other device over the first communication channel upon engagement of the trigger coupled to the device, (2) receives, on the first communication channel, a commitment value derived from a security value; (3) produces, on the first communication channel, information for use in generating a shared secret; (4) after step (3), receives a security value on the first communication channel; (5) attempts to derive the commitment value received at step (2) from the security value received at step (4) and, if the commitment value is not successfully derived from the security value, terminates the registration process; (6) generates a first secret to-be-shared with the other device, (7) communicates on the second communication channel verification information related to the first secret, and (8) is enabled to use the first secret upon receipt of an indication that a third party is assured that the first secret is shared with the other device.

16. The device of claim 15 wherein the commitment value is a hash of the security value.

17. The device of claim 15 wherein the verification information is a hash value derived from the first secret and the security value.

18. The device of claim 17 wherein the verification information is a hash value derived from the catenation of the first secret with the security value.

19. The device of claim 15 wherein the length of the verification information is shorter than a length needed to provide an identical level of security in a method that does not utilize a commitment value.

20. The method of claim 15 wherein the verification information is a credential.

21. A server capable of registering a device to a network, comprising:
 an interface to a first communication channel associated with a first communication method;
 an interface to a second communication channel associated with a communication method other than the first communication method; and
 a registration process that (1) derives a commitment value from a registration nonce by computing a hash of the registration nonce and communicates the commitment value to the device on the first communication channel upon detecting that a trigger coupled to the device has been engaged; (2) after step (1), communicates a registration nonce to the device on the first communication channel; (3) upon determining that the device has successfully derived the commitment value from the registration nonce, generates a first secret that is to be shared with the device using the first communication channel; (4) validates verification information derived from the first secret on the second communication channel; and (5) enables the network to use the first secret upon receipt of an indication that a third party is assured that the first secret is shared with the device.

22. The server of claim 21 wherein the sewer generates the first secret using Diffie-Hellman key exchange.

23. The server of claim 21 wherein the verification information is derived from a hash of the first secret.

24. The server of claim 21 wherein the verification information comprises a credential.

25. A server capable of registering a device to a network, comprising:
 an interface to a first communication channel associated with a first communication method;
 an interface to a second communication channel associated with a communication method other than the first communication method; and
 a registration process that (1) determines that the registration process has been initiated at the device by detecting that a trigger physically coupled to the device has been engaged; (2) after step (1), communicates to the device over the first communication channel a commitment comprising information derived from a security value; (3) communicates to the device over the first communication channel information for use in generating a shared secret; (4) after step (3), communicates the security value to the device over the first communication channel and terminates the registration process upon an indication from the device that the device has unsuccessfully attempted to derive the commitment communicated at step (2) from the security value; (5) generates a first secret to-be-shared with the device; (6) communicates over the second communication channel verification information related to the secret; and (7) enables the network to use the first secret upon receipt of an indication that a third party is assured that the first secret is shared with the device.

26. The server of claim 25 wherein the commitment is a hash of the security value.

27. The server of claim 25 wherein the verification information is a hash value derived from the secret and the security value.

28. The server of claim 27 wherein the verification information is a hash value derived from the catenation of the first secret with the security value.

29. The server of claim 25 wherein the length of the verification information is shorter that a length needed to provide an identical level of security in a method that does not utilize a commitment.

30. The method of claim 25, wherein the verification information comprises a credential.

* * * * *